United States Patent Office 3,711,478
Patented Jan. 16, 1973

3,711,478
3-ARYL-BENZAZINES
Klaus Irmscher, Josef Kramer, Gerhard Cimbollek, Dieter Orth, Herbert Nowak, and Karl-Otto Freisberg, Darmstadt, Germany, assignors to Merck Patent Gesellschaft mit beschränkter Haftung, Darmstadt, Germany
No Drawing. Filed Nov. 13, 1969, Ser. No. 876,611
Claims priority, application Germany, Nov. 18, 1968, P 18 09 454.7; Nov. 23, 1968, P 18 10 561.8
Int. Cl. C07d 93/12
U.S. Cl. 260—243 R   23 Claims

ABSTRACT OF THE DISCLOSURE

3 - aryl-benzazines having serum cholesterol lowering activity of the formula

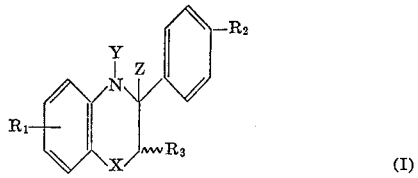

wherein $R_1$ and $R_2$ are H, OH, esterified OH, alkyl, alkoxy or benzyloxy, $R_3$ is alkyl, X is O or S, Y is H or acyl and Z is H or Y and Z collectively are a C–N bond are prepared by cyclizing of the following classes of compounds:

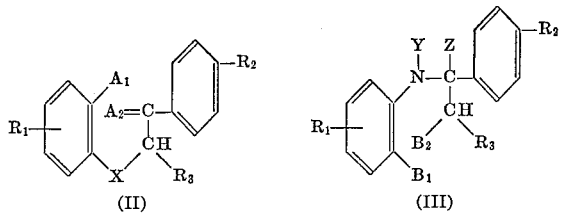

wherein $A_1$ is $NH_2$ or halogen, $A_2$ is $=O$, $=S$, $=NH$, (H, $NH_2$) or (H, halogen), at least one being a nitrogen function, and $B_1$ and $B_2$ are OH, SH or reactive functional derivatives thereof, or (one of $B_1$ and $B_2$ only) H or halogen; or by reducing or dehydrating compounds of Formula I and compounds otherwise corresponding to Formula I wherein Z is OH; or by hydrolyzing or hydrogenating compounds otherwise corresponding to Formula I wherein $R_1$ and/or $R_2$ is a functionally modified OH group convertible to an OH group by hydrolysis or hydrogenolysis.

BACKGROUND OF THE INVENTION

This invention relates to 3-aryl-benzazines having pharmacological activity, more particularly to 2-alkyl-3-aryl-benzazines having anti-cholesterol activity.

SUMMARY OF THE INVENTION

The compounds of this invention have the formula

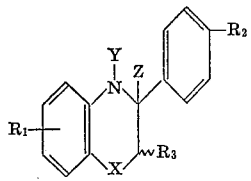

wherein $R_1$ and $R_2$, which can be identical or different, are H, OH, esterified OH, alkyl of 1–4 carbon atoms, alkoxy of 1–4 carbon atoms, or benzyloxy; $R_3$ is alkyl of 1–6 carbon atoms; X is O or S; Y is H or hydrocarbonacyl of 1–8 carbon atoms and Z is H, or Y and Z collectively are a C–N bond, with the provision that when $R_1$ is H, $R_2$ is $CH_3O$, X is S, and Y and Z collectively represent a C–N bond, $R_3$ is other than $C_2H_5$, and the physiologically acceptable acid addition salts thereof. The compounds of this invention exhibit excellent cholesterol-level-lowering effects with good physiological compatibility.

DETAILED DESCRIPTION OF THE INVENTION

In particular, the invention relates to 3-aryl-2H-1,4-benzoxazines of Formula I wherein X is O and Y and Z collectively are a C–N bond (Ia); 3-aryl-1,4-benzomorpholines of Formula I wherein X is O and Y is H or hydrocarbonacyl of 1–8 carbon atoms and Z is H (Ib); 3-aryl-2H-1,4-benzothiazines of Formula I wherein X is S and Y and Z collectively are a C–N bond (Ic); and 3-aryl-1,4-benzothiomorpholines of Formula I wherein X is S and Y is H or hydrocarbonacyl of 1–8 carbon atoms and Z is HH (Id); both in free base form and in the form of the physiologically acceptable acid addition salts. The serum cholesterol lowering activity of these compounds can be demonstrated by systemic administration to laboratory test animals according to standard procedures. For example, oral administration of various dosages of the compounds set forth below to rats (for methodology see Counsell et al., J. Med. Pharm. Chem. 5, 729 (1962)) resulted in the following reductions in serum cholesterol levels:

| Compound | Dosage (mg./kg.) | Reduction in cholesterol level, percent |
|---|---|---|
| 2-methyl-3-anisyl-2H-1,4-benzoxazine | 30 | 39 |
|  | 100 | 83 |
| 2-methyl-3-anisyl-1,4-benzo-morpholine | 30 | 51 |
|  | 25 | 83 |
| 2-methyl-3-anisyl-2H-1,4-benzothiazine | 3 | 41 |
| 2-ethyl-3-p-hydroxyphenyl-2H-1,4-benzothiazine hydrochloride | 100 | 67 |
|  | 10 | 49 |
| 2-methyl-3-p-hydroxyphenyl-2H-1,4-benzothiazine hydrochloride | 10 | 46 |
|  | 3 | 31 |
| 2-n-propyl-3-p-hydroxyphenyl-2H-1,4-benzothiazine hydrochloride | 100 | 43 |
|  | 30 | 27 |
|  | 30 | 80 |
| 2-methyl-3-anisyl-1,4-benzothiomorpholine | 3 | 40 |
|  | 1 | 21 |
| 2-methyl-3-p-hydroxyphenyl-1,4-benzothiomorpholine | 30 | 55 |
| 2-ethyl-3-p-hydroxyphenyl-1,4-benzothiomorpholine | 30 | 69 |
| 2-propyl-3-p-hydroxyphenyl-1,4-benzothiomorpholine | 30 | 39 |

The compounds of this invention also exhibit estrogenic, contraceptive, cardio-active, and antimycotic effects. Accordingly, the compounds of this invention can be employed as pharmaceutical agents. They are also useful as intermediates for the preparation of other drugs.

In particular, this invention relates to the following classes of compounds of Formula I, both the free bases and the physiologically acceptable acid addition salts thereof;

Ie: $R_3$ is $CH_3$;
If: $R_2$ is H, OH, esterified OH, alkyl of 1–4 carbon atoms, or benzyloxy, and $R_3$ is alkyl of 2–6 carbon atoms;
Ig: $R_1$ represents two meta-substituents, the one meta to the ring nitrogen atom is H or $CH_3$ and the one meta to X being H or $OCH_3$; $R_2$ is H, OH, acyloxy of up to 8 carbon atoms, or $OSO_3Na$; and Y is H, acetyl, benzoyl, or, collectively with Z, a C—N bond;
Ih: $R_1$ is H;
Ii: $R_1$ is H and $R_2$ is H or OH and Y is H or, collectively with Z, a C—N bond;
Ij: Compounds of Group Ii in which $R_2$ is OH and $R_3$ is $CH_3$, $C_2H_5$ or n-$C_3H_7$;
Ik: Compounds of Formula I wherein $R_1$ is H, $R_2$ is OH or except when in combination X is S, $R_3$ is $C_2H_5$, and Y and Z collectively are a C—N bond, $OCH_3$;

II: Compounds of Formula I wherein $R_1$ and Y have the values given for compounds of Group Ig, $R_2$ has the values given for compounds of If and $R_3$ is $CH_3$;

Im: Compounds of Group Ie where $R_1$ is H;

In: Compounds of Group Im wherein $R_2$ is H, OH or $OCH_3$ and Y has the values given for compounds of Group Ii; and Io: Compounds of Group In where $R_2$ is $OCH_3$.

In its process aspect, this invention relates to processes for the preparation of 3-aryl-benzazines of Formula I, both the free bases and physiologically acceptable acid addition salts thereof, (a) By treating with cyclizing agents a compound of Formula II

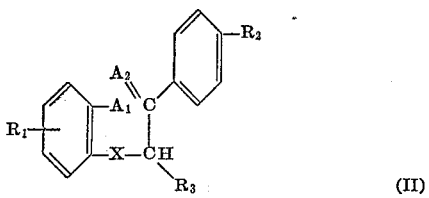

wherein $A_1$ is $NH_2$ or Hal and $A_2$ is $=O$, $=S$, $=NH$, $(H, NH_2)$ or $(H, Hal)$, Hal in each instance being Cl, Br or I, at least one of the residues $A_1$ or $A_2$ containing a nitrogen atom; or (b) Treating with a cyclizing agent a compound of Formula III

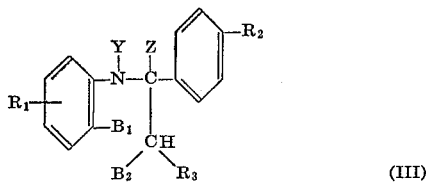

wherein $B_1$ and $B_2$ both are OH, SH or reactively functionalized OH or SH, and, additionally, one of $B_1$ and $B_2$ can be H or Hal;

(c) By treating a compound of Formula I or a compound otherwise corresponding to Formula I in which Z is OH (IV) with a reducing and/or water-liberating agent; or (d) By treatment with hydrolyzing or hydrogenolyzing agents, of a compound otherwise corresponding to Formula I but containing, in place of the residues $R_1$ and/or $R_2$, a functionally modified OH-group; and/or (e) Removing with dehydrogenating agents in a compound of the general Formula I, hydrogen atoms present in the 3- and 4-positions of the azine ring; and/or (f) By etherifying or esterifying with alkylating or esterifying agents free OH-groups in compounds of Formula I; and/or (g) By acylating with acylating agents an NH-group in a compound of Formula I; and/or (h) By converting free base compounds of Formula I into the physiologically acceptable acid addition salts thereof.

In the above, "esterified OH" preferably means an OH-group esterified with a saturated or unsaturated aliphatic, cycloaliphatic, aromatic or heterocyclic substituted or unsubstituted carboxylic acid or sulfonic acid of up to 18, preferably up to 8, carbon atoms. Preferred carboxylic acids are fatty acids of 1–18, preferably 1–6 carbon atoms, e.g., formic acid, acetic acid, propionic acid, butyric acid, isobutyric acid, valeric acid, isovaleric acid, trimethylacetic acid, caproic acid, isocaproic acid, enanthic acid, caprylic acid, pelargonic acid, capric acid, lauric acid, myristic acid, palmitic acid and stearic acid. Other carboxylic acids are unsaturated aliphatic, e.g., crotonic acid, oleic acid, cycloalkyl, e.g., cyclohexanecarboxylic acid, cycloalkylalkyl, e.g., cyclohexylacetic and cyclohexylpropionic acid, carbocyclic aryl, e.g., benzoic acid, carbocyclic arylalkyl, e.g., phenylacetic and phenylpropionic acid, and heterocyclic aliphatic and aryl, e.g., picolinic acid, nicotinic acid, isonicotinic acid or furan-2-carboxylic acid.

Of particular importance are those esters having a substituent which renders the compound of Formula I bearing the ester group water-soluble, e.g., carboxy, hydroxy or amino, since these compounds can be used, especially in the form of the ester salts thereof, for the preparation of aqueous solutions, which lend themselves eminently well to therapeutic uses. The thus-obtained hemi-esters or hydroxy or amino esters are derived, for example, from dicarboxylic acids, which can be aliphatic, e.g., oxalic, malonic, succinic, maleic, glutaric, dimethylglutaric, adipic, pimelic, ketocarboxylic, e.g., acetonedicarboxylic, aromatic, e.g., phthalic, cycloaliphatic, e.g., tetrahydrophthalic and hexahydrophthalic acid, oxydicarboxylic, e.g., diglycolic acid, hydroxycarboxylic, e.g., glycolic acid, or aminocarboxylic acid, e.g., diethylaminoacetic acid or aspartic acid.

Preferred sulfonic acid esters are esters of alkylsulfonic acids of 1 to 6 carbon atoms, e.g., methane- or ethanesulfonic acid, and arylsulfonic acids of 6 to 10 carbon atoms, e.g., benzene-, p-toluene-, 1- and 2-naphthalenesulfonic acid.

$R_1$ and $R_2$ can each represent an OH-group esterified with an inorganic acid, e.g., sulfuric acid or phosphoric acid, as well as an ester salt group derived from such an ester, for example, a sodium salt group, e.g., sodium sulfate.

The term ester as used herein includes the physiologically acceptable acid addition salts (particularly the hydrochlorides) of basically substituted esters and the physiologically acceptable metallic salts (especially the alkalimetal, e.g., sodium salts), and ammonium salts of acidic esters.

In $R_1$ and $R_2$, alkyl preferably is methyl, ethyl or n-propyl; alkoxy preferably is methoxy or ethoxy. However, $R_1$ and $R_2$ can also be, e.g., isopropyl, n-butyl, isobutyl, sec.-butyl, tert.-butyl, n-propoxy, isopropoxy, n-butoxy, isobutoxy, sec.-butoxy or tert.-butoxy. $R_3$ is preferably methyl, ethyl or n-propyl, but can also be e.g., isopropyl, n-butyl, isobutyl, sec.-butyl, tert.-butyl, n-pentyl, isopentyl, n-hexyl or isohexyl.

Y preferably represents H or, collectively with Z, a C—N bond. Y can also be hydrocarbonacyl of 1 to 8 carbon atoms, preferably an acyl group of a fatty acid of 1 to 6 carbon atoms, e.g., acetic acid, propionic acid or butyric acid, or of benzoic acid.

The wavy line in Formulae I and Ia to Id means that the residue can be in the cis-position as well as in the trans-position with respect to the phenyl group. Accordingly, two isomers are possible for each compound of these formulae. In the process of this invention, normally only one of the two isomers is isolated, since it is produced predominantly. In case both isomers are obtained they can be separated by conventional means, preferably by fractional crystallization or by chomatographic fractionation.

In the compounds of this invention, $R_1$, which can represent 1 or more groups, preferably 1 or 2, is preferably in the 6- and/or 7-position of the benzazine ring. However, this group can alternatively or additionally be present in the 5- or 8-position.

The starting compounds for the preparation of the benzazines of Formula I can, if desired, be formed in situ so they are not isolated from the reaction mixture but are immediately further reacted to form the compounds of Formula I. The compounds of Formula I are preferably obtained by cyclization of compounds of Formula II or III.

In the compounds of Formulae II and III, —OH or —SH groups, respectively, can also be present in a reactively functionalized form, i.e., instead of a free —OH or —SH group being present there is present a group convertible to a —OH or —SH group, e.g., an ester or ether thereof. Preferred of such reactively functionalized —OH groups are lower alkanoyloxy of up to 6 carbon atoms, e.g., acetoxy, propionyloxy, butyryloxy, aryloxy or aralkyloxy, e.g., benzyloxy, diphenylmethoxy, triphenylmethoxy, heterocyclic oxy, e.g., tetrahydropyranyl-(2)-oxy, alkoxy, e.g., tert.-butoxy. Other examples of reactively functionalized —OH groups are alkyl-sulfonyloxy of 1 to 6 carbon atoms, e.g., methanesulfonyloxy, arylsulfonyloxy of 6 to 10 carbon atoms, e.g., benzene-, naphthalene- or especially p-toluenesulfonyloxy. Preferred reactively functionalized SH-groups are lower-alkanoyl mercapto, e.g., acetyl mercapto, aralkylmercapto, e.g., benzylmercapto, and halomercapto, e.g., SCl.

Preferred starting compounds of Formula II are the aminoketones (II; $A_1=NH_2$, $A_2=O$). These can be obtained by reducing the corresponding nitroketones (II; $A_1=NO_2$, $A_2=O$), for example, with iron or with $SnCl_2$ in hydrochloric acid/acetic acid. They also can be produced by reacting o-aminophenol bearing an $R_1$ group as defined above with an α-bromoacylophenone bearing an $R_2$ group as defined above in the p-position, preferably in acetone in the presence of potassium carbonate. The nitroketones having a bridging oxygen atom (II; X=O, $A_1=NO_2$, $A_2=O$) can, in turn, be prepared by reacting the corresponding o-nitrophenols with α-bromocyclophenones and the nitroketones having a bridging sulfur atom (II; X=S, $A_1=NO_2$, $A_2=O$) can be produced by reacting the corresponding o-nitrophenyl sulfur chlorides with acylophenones.

Especially suitable starting compounds are the imines (II; $A_1=NH_2$, $A_2=NH$) of the above-mentioned aminoketones, obtainable, for example, by reacting Grignard reagents $R_3MgBr$ with benzonitriles to produce the corresponding imines and then reaction with o-nitrophenyl sulfur chlorides to obtain the nitroimine (II; $A_1=NO_2$, $A_2=NH$) and reduction; the diamines (II; $A_1=NH_2$, $A_2=(H, NH_2)$), obtainable, for example, by reacting optionally substituted o-aminophenols or o-aminothiophenols with an optionally p-substituted 1-amino-1-phenyl-2-alkanol in an acidic solution; the haloamines (II; $A_1=NH_2$, $A_2=(H, Hal)$) obtainable, for example, by reacting o-aminophenols or o-aminothiophenols as defined above with 1,2-dihalo-1-arylalkanes; the haloamines (II; $A_1=Hal$, $A_2=(H, NH_2)$); obtainable, for example, by reacting o-halophenols or o-halothiophenols with 1-aryl-1-amino-2-alkanols.

A particularly preferred embodiment of the process aspect of this invention resides in producing, in situ, an aminoketone of the Formula II ($A_1=NH_2$; $A_2=O$) by reducing the corresponding nitroketone of Formula II ($A_1=NO_2$, $A_2=O$), for example, with powdered iron in an ethanolic hydrochloric acid solution or with hydrochloric $SnCl_2$-solution and then, without isolating the aminoketone, cyclizing it under the acidic reduction conditions. Typical nitroketones are those otherwise corresponding to compounds of Formula II but $A_1$ is —$NO_2$ and $A_2$ is =O and $R_1$ and $R_2$ have the values given for compounds of Group Ig(V). Particularly preferred are those wherein $R_1=H$, especially the latter wherein $R_2$ is H, OH or $OCH_3$.

Particularly suitable as starting compounds of Formula III are the following:

The diols ($B_1$ and $B_2=OH$) or the hydroxythiols wherein $B_1=SH$ and $B_2=OH$, which can be obtained by reacting o-aminophenols or o-aminothiophenols with 1-aryl-1-bromo-2-alkanols; the hydroxythiols wherein $B_1=OH$ and $B_2=SH$; or the dithiols ($B_1$ and $B_2=SH$), which can be obtained by reacting o-halophenols or o-halothiophenols with 1-aryl-1-amino-2-alkanols; the halophenols wherein $B_1=OH$ and $B_2=Hal$, which preferably are obtained in situ by the effect of o-aminophenols on 1-aryl-1,2-dihaloalkanes, or by reacting o-aminophenylacetates with 1-aryl-1,2-dihaloalkanes, preferably in acetone, in the presence of $K_2CO_3$, followed by hydrolysis; the halothiophenols wherein $B_1=SH$ and $B_2=Hal$, which can be produced by reacting o-aminobenzenesulfonic acids with 1-aryl-1,2-dihaloalkanes to the corresponding sulfonic acids ($B_1=SO_3H$ and $B_2=Hal$), followed by conversion of the sulfo-group into the sulfochloride group, for example with $PCl_5$, and reducing the latter to the corresponding mercaptan, e.g., with zinc/HCl; the haloalcohols ($B_1=Hal$ and $B_2=OH$) or the halomercaptans ($B_1=Hal$, $B_2=SH$), which can be obtained by reacting o-haloanilines with 1-aryl-1-bromo-2-alkanols or with 1-aryl-1-bromo-2-alkanethiols, respectively; the aryl sulfur halides ($B_1=SHal$, particularly SCl, and $B_2=H$), which can be obtained, for example, by reacting o,o'-diaminodiaryl disulfides with 2 mols of 1-aryl-1-bromoalkanes to the corresponding o,o'-(1-aryl-1-alkylamino)-diphenyl disulfides, and cleavage of the disulfide bridge, for example with chlorine in $CCl_4$ at 0° C.; the aralkyl sulfur halides ($B_1=H$ and $B_2=SHal$, particularly SCl), which can be obtained by brominating bis-(1-aryl-2-alkyl)-disulfides to bis-(1-aryl-1-bromo-2-alkyl) disulfides, reacting the bromo compound with 2 mols of an arylamine, and then cleaving the disulfide bridge, for example with chlorine in carbon tetrachloride.

The compounds of Formulae II and III, respectively, can be cyclized, more specifically, using basic or acidic cyclizing catalysts to obtain the benzazines of Formula I. Preferably, the catalysts employed are alkalies, e.g., NaOH or KOH, $NaNH_2$, NaH, basically reacting salts, e.g., sodium or potassium acetate, sodium or potassium carbonate, organic bases, e.g., tetramethylguanidine, benzyl trimethylammonium hydroxide, mineral acids, e.g., hydrochloric acid, hydrobromic acid, sulfuric acid, phosphoric acid, polyphosphoric acid; organic sulfonic acids, e.g., toluenesulfonic acid or camphorsulfonic acid, Lewis acids, e.g., $AlCl_3$, $ZnCl_2$; or acidic salts, e.g., $KHSO_4$.

The cyclization can be conducted in the presence of an additional inert solvent, for example in the presence of a lower alcohol, e.g., methanol and ethanol, an ether, e.g., dioxane and tetrahydrofuran; an ester, e.g., ethyl acetate, a carboxylic acid, e.g., acetic acid, a hydrocarbon, e.g., "Tetralin" (tetrahydronaphthalene), benzene, toluene and a chlorinated hydrocarbon, e.g., methylene chloride and chloroform, or a mixture of one or more of these solvents with one another. It is also possible to employ an excess of the cyclization agent as the solvent. The cyclization takes place at temperatures of between about 0 to 200° C., preferably between 10 and 100° C. and usually at about room temperature. The reaction can be accelerated by heating, optionally up to the boiling point of the solvent employed. The reaction time is several minutes up to several days.

The preferred cyclization conditions depend on the constitution of the starting substances. Thus, aminoketones and the imines thereof (II; $A_1=NH_2$, $A_2=O$ or NH) are preferably cyclized in an acidic medium, for example by boiling the reaction mixture for several hours with aqueous, aqueous-alcoholic or alcoholic hydrochloric acid or sulfuric acid. The same is true for the ring closure of the mercaptans (III; $B_1=OH$ or SH, $B_2=SH$) which, under acidic conditions, split off 1 mol of $H_2S$, thus producing cyclic ethers or thioethers, respectively. Diamines (II; $A_1=NH_2$, $A_2=(H, NH_2)$) are preferably cyclized by heating in the presence of catalytic amounts of iodine, usually without a solvent, to a temperature between 50 and 250° C., preferably a temperature slightly above the melting point of the diamine.

The haloamines (II; $A_1=NH_2$, $A_2=(H, Hal)$), the halophenols (III; $B_1=OH$, $B_2=Hal$) and the halothiophenols (III; $B_1=SH$, $B_2=Hal$) are usually cyclized with basic catalysts, since one molecule of hydrogen halide is split off during the cyclization. The haloamines (II; $A_1=Hal$, $A_2=(H, NH_2)$), the haloalcohols and the halomercaptans, respectively (III; $B_1$=Hal, $B_2$=OH or SH) also are preferably reacted with the aid of basic catalysts, usually under more vigorous conditions than employed with the above-mentioned haloamines. Suitable cyclization agents for these starting materials are strong bases, e.g., KOH, NaH and $NaNH_2$.

Amines of Formula III wherein $B_1$=OH or SH and $B_2$=OH can also be cyclized with dicyclohexyl carbodiimide, preferably in methylene chloride.

The aryl sulfur halides (III; $B_1$=SHal, $B_2$=H and Y and Z preferably represent a C—N bond) can be cyclized to the desired benzothiazines by heating them, without a catalyst and without a solvent, to a temperature between 60 and 140° C., preferably between 90 and 110° C. However, it is also possible to cyclize them by letting them stand for some time in the presence of an inert solvent at room temperature or to heat them for a rather brief period of time, optionally up to the boiling point of the solvent. The cyclization reaction readily takes place with one mol of hydrogen halide being split off. Particularly suitable solvents are chlorinated hydrocarbons, especially trichloroethylene.

The cyclization of aralkyl sulfur halides (III; $B_1$=H, $B_2$=SHal) can be effected under Friedel-Crafts reaction conditions, in the presence of a Lewis acid, preferably aluminum chloride.

The benzazines of Formula I can also be obtained by the reduction or dehydration of compounds of Formula IV. For example, a catalytic hydrogenation or a reduction with complex metal hydrides of benzoxazines (Ia) or benzothiazines (Ic), respectively, of this invention, results in benzomorpholines (Ib) and benzothiomorpholines (Id), respectively. Suitable catalysts for the hydrogenation step are, for example, noble metal, nickel, and cobalt catalysts, as well as copper-chromium oxide. The noble metal catalysts can be employed as supported catalyst, such as, for example, palladium on charcoal, calcium carbonate or strontium carbonate, as oxide catalysts, such as, for example, platinum oxide, or as finely divided metal catalysts. Nickel and cobalt catalysts are suitably utilized as Raney metals, also nickel on kieselguhr or pumice as the support. The hydrogenation can be conducted at room temperature and normal temperature, or at elevated temperature and/or elevated pressure. Preferably, the reaction is conducted at pressures of between 1 and 100 atmospheres, and at temperatures of between −80° C. and +150° C. Suitably, the reaction is carried out in the presence of an inert solvent, e.g., methanol, ethanol, isopropanol, tert.-butanol, ethyl acetate, dioxane, glacial acetic acid, tetrahydrofuran or water. In some cases, the addition of a catalytic amount of a mineral acid, e.g., hydrochloric or sulfuric acid, is advantageous. The free base of Formula I wherein Y and Z are a C—N bond or a compound otherwise corresponding to Formula I in which Y=H and Z=OH, or an acid addition salt thereof, can be employed in the hydrogenation. Preferably, the reaction is conducted at ambient pressure with the hydrogenation being terminated after absorption of the stoichiometric amount of hydrogen. When employing starting compounds of Formula IV wherein phenolic hydroxyl groups are blocked by benzyl groups, the benzyl groups can be removed during the hydrogenation.

Suitable chemical reducing agents are the complex metal hydrides, such as, in particular, $LiAlH_4$ and $NaBH_4$, optionally with the addition of catalysts, e.g., $BF_3$, $AlCl_3$ or LiBr. These reductions are suitably conducted in the presence of an inert solvent, such as ether, tetrahydrofuran, ethylene glycol dimethyl ether, or, preferably pyridine. However, when employing $NaBH_4$, it is also possible to conduct the reaction in aqueous or alcoholic solutions. The reduction is advantageously conducted between −80° C. and the boiling point of the solvent, preferably between 0 and 100° C. The thus-formed metal complexes can be decomposed, for example, with moist ether or an aqueous $NH_4Cl$ solution.

Hydroxy compounds otherwise corresponding to Formul I in which Z=OH can be obtained by reacting a lactam of Formula VI

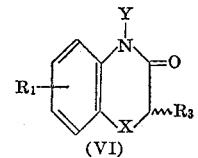

(VI)

with an organometallic compound of Formula VII

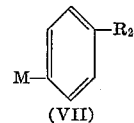

(VII)

wherein M represents a metallo group, e.g., Li or the group MgHal, preferably MgBr, in an inert solvent, such as tetrahydrofuran, suitably under boiling.

The lactams of Formula VI can be produced by reacting an o-nitrophenol or o-nitrothiophenol with an ethyl ester of α-bromoalkanoic acid of the Formula

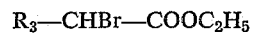

to the α-(o-nitrophenoxy)- or the α-(o-nitrophenylmercapto)-alkanoic acid ethyl ester, respectively, and reduction thereof, with powdered iron in aqueous methanol, during which process saponification and ring closure to IV are effected.

The hydroxy group in compounds otherwise corresponding to Formula I in which Z=OH can readily be removed by hydrogenolysis, for example on palladium charcoal, at room temperature, thus obtaining morpholines of Groups Ib and Id. It is also possible to treat these hydroxy compounds with agents which split off water, thus obtaining benzazines of Groups Ia and Ic. The dehydration process takes place very readily, for example during the acidic work-up with hydrochloric acid or ammonium chloride solution of the reaction mixture obtained during the reaction of VI with VII. In case the hydroxy compounds are isolated, it is also possible to employ the conventional dehydration agents, for example $H_2SO_4$, HBr, $KHSO_4$, p-toluenesulfonic acid, oxalic acid, $P_2O_5$, $POCl_3$, $ZnCl_2$, acetyl chloride, dicyclohexyl carbodiimide, under the conditions described in the literature for such dehydration reactions.

In a compound otherwise corresponding to Formula I, but containing, in place of the residues $R_1$ and/or $R_2$, functionally modified —OH groups, the OH groups can be liberated by hydrolysis or reduction. For example, esterified hydroxy groups or blocked hydroxy groups, e.g., tetrahydropyranyl ether or benzyl ether, can be hydrolyzed in a basic, neutral or acidic medium. Suitable bases are, e.g., aqueous, aqueous-alcoholic or alcoholic sodium or potassium hydroxide. Suitable acids are, e.g., hydrochloric acid and sulfuric acid. Benzyloxy groups can be split by hydrogenolysis.

Furthermore, in a compound of Formula I wherein Y and Z=H, the two hydrogen atoms present in the 3- and 4-position of the azine ring can be removed by dehydrogenating agents, thus obtaining benzazines of Groups Ia and Ic. This dehydrogenation step takes place very easily, for example by allowing a solution of the compound of Formula I wherein Y and Z=H to stand in air, or by passing air or oxygen through such a solution. Suitable solvents are the conventional inert solvents, preferably lower alcohols, e.g., methanol, ethanol or isopropanol. The dehydrogenation is effected at temperatures of between 0 and 120° C., preferably between room temperature and the boiling point of the solvent employed.

The dehydrogenation can also be achieved by the influence of other mild oxidizing agents, e.g., $PtO_2$, $PdO_2$, $FeCl_3$, nitrobenzene or $K_3Fe(CN)_6$, under the conditions described in the literature for such dehydrogenation reactions.

Any free hydroxy groups present in the thus-obtained product can be alkylated or esterified. The etherification can be conducted, for example, by reaction with corresponding alkyl halides, alkyl sulfates, or lower alkyl esters, in the presence of a base, e.g., sodium or potassium hydroxide or carbonate, in one of the conventional inert solvents. Accordingly, the starting compounds can be reacted, for example, with methyl, ethyl, propyl, isopropyl, n-butyl or isobutyl halides, p-toluenesulfonates or sulfates, or with the corresponding alcohols. Suitable halides are the chlorides, bromides and iodides. If desired, one can start with the corresponding alkali-metal phenolates, reacting them with an alkyl halide, preferably in acetone in the presence of potassium carbonate. However, it is also possible to react the free phenols with the corresponding alcohols in the presence of acidic catalysts, such as sulfuric acid, phosphoric acid or p-toluenesulfonic acid.

Esterification of hydroxy groups can be effected, for example, by heating with an anhydride or halide of acetic, propionic, butyric, isobutyric, valeric, isovaleric, caproic, benzoic, nicotinic or isonicotinic acid, preferably in the presence of a base, e.g., pyridine, or of an alkali salt of the corresponding acid, or a small amount of a mineral acid, e.g., sulfuric acid or hydrochloric acid. In order to obtain the sulfuric acid and phosphoric acid esters of compounds of Formula I which contain one or more —OH groups, these hydroxy compounds are reacted with sulfuric acid, phosphoric acid, or a derivative of these acids suitable for esterification, the processes being conducted in accordance with methods known in the literature.

It is also possible to conduct the reaction with a derivative of a sulfuric acid or phosphoric acid in which one or two hydroxy groups, respectively, are blocked, and to remove from the thus-obtained ester compounds of Formula I the blocking groups present therein by hydrolysis or hydrogenolysis. Finally, the thus-obtained sulfuric acid or phosphoric acid esters can be converted, by treatment with bases, into the physiologically acceptable metallic or ammonium salts thereof.

The NH group of a compound of Formula I in which Y=H, can be acylated, e.g., by reaction with an anhydride or halide, e.g., chloride or bromide, of a carboxylic acid of 1 to 8 carbon atoms, e.g., acetic, propionic, butyric, isobutyric, valeric, isovaleric, caproic, enanthic, benzoic, caprylic, o-, m- or p-toluylic acid, at a temperature between 0 and 200° C., preferably between 20 and 120° C., optionally in the presence of an inert solvent.

The benzazines of Formula I in free base form can be converted, by treatment with acids, into the physiologically compatible acid addition salts thereof. Suitable for this reaction are those acids yielding physiologically acceptable salts. Thus, it is possible to employ organic and inorganic acids, such as, for example, aliphatic, alicyclic, araliphatic, aromatic or heterocyclic, mono- or polybasic carboxylic or sulfonic acids, including formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methane-sulfonic acid, naphthalene-mono- and naphthalene-disulfonic acids, sulfuric acid, nitric acid, hydrohalic acids, e.g., hydrochloric acid or hydrobromic acid, or phosphoric acids, e.g., orthophosphoric acid.

The novel compounds can be employed in a mixture with solid and/or liquid pharmaceutical excipients conventional in human or veterinary medicine. Suitable carrier substances are those organic or inorganic compounds amenable to parenteral, enteral or topical application, and which are non-reactive with the novel compounds, such as, for example, water, vegetable oils, polyethylene glycols, gelatin, lactose, amylose, magnesium stearate, talc, Vaseline, cholesterol. For parenteral application, particularly solutions are employed, preferably oily or aqueous solutions, as well as suspensions, emulsions or implants. For enteral application, tablets, dragees, syrups or juices can, for example, be used. Suitable for topical application are salves, creams or powders. The above-mentioned preparations can, if desired, be sterilized, or mixed with auxiliary agents, such as preservatives, stabilizers or wetting agents, salts for influencing the osmotic pressure, buffer substances, coloring or flavoring agents and/or aromatic substances.

The compounds of this invention are preferably employed to lower serum cholesterol levels in mammals by the systemic administration to patients having above normal serum cholesterol levels of amounts effective to reduce significantly the serum cholesterol levels. They are preferably administered in dosages of 1 to 500 mg.

The compounds of this invention are generally administered to mammals including domestic pets, together with an amount of a pharmaceutically acceptable carrier which provides a convenient unit dosage size, e.g., 1 to 5,000 mg. of carrier per unit dose of the compound of Formula I.

Oral administration generally is preferred, particularly in tablet or capsule form.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The temperatures in the following examples are set forth in degrees centigrade.

Example 1

(a) A solution of 6.02 g. of α-(o-nitrophenoxy)-p-methoxy-propiophenone (M.P. 129–130°), which is obtainable by the reaction of α-bromo-p-methoxy-propiophenone and the K-salt of o-nitrophenol in acetone in the presence of potassium carbonate, in 375 ml. of 70% ethanol is mixed with 5 g. of powdered iron and heated to the boiling point. With stirring, 0.32 ml. of concentrated hydrochloric acid in 5 ml. of 70% ethanol is added dropwise, and the mixture is boiled for 6 hours. After cooling, the reaction mixture is filtered, the filtrate is concentrated and distributed between water and chloroform. The chloroform phase is washed with water, dried over sodium sulfate and evaporated, thus obtaining 2-methyl - 3 - anisyl - 2H - 1,4-benzoxazine, M.P. 124–125° (from ether).

Analogously, the following compounds are obtained: from α-(3-methoxy - 6 - nitrophenoxy)-p-methoxypropiophenone (M.P. 104–106°; obtainable from the K salt of 3-methoxy-6-nitrophenol and α-bromo-p-methoxypropiophenone):

2-methyl-3-anisyl-7-methoxy-2H-1,4-benzoxazine;
from p-benzyloxypropiophenone-α-o-nitrophenyl ether:
    2-methyl-3-p-benzyloxyphenyl-2H-1,4-benzoxazine;
from p-hydroxypropiophenone-α-o-nitrophenyl ether:
    2-methyl-3-p-hydroxyphenyl-2H-1,4-benzoxazine;
from α-(2-nitrophenoxy)-butyrophenone:
    2-ethyl-3-phenyl-2H-1,4-benzoxazine;
from α-(3-methoxy-6-nitrophenoxy)-butyrophenone:
    2-ethyl-3-phenyl-7-methoxy-2H-1,4-benzoxazine;
from α-(2-nitrophenoxy)-p-benzyloxy-butyrophenone:
    2-ethyl-3-p-benzyloxyphenyl-2H-1,4-benzoxazine;
from α-(2-nitrophenoxy)-p-hydroxy-butyrophenone:
    2-ethyl-3-p-hydroxyphenyl-2H-1,4-benzoxazine.

(b) 2.53 g. of 2-methyl-3-anisyl-2H-1,4-benzoxazine is dissolved in 100 ml. of methanol and hydrogenated on 0.5 g. of 5% Pd/C. After absorption of the stoichiometric amount of hydrogen, the reaction mixture is filtered and evaporated, thus obtaining 2-methyl-3-anisyl-1,4-benzomorpholine, M.P. 64° (from ether/petroleum ether).

Analogously, the following compounds are obtained by hydrogenating the corresponding 2H-1,4-benzoxazines:

2-methyl-3-anisyl-7-methoxy-1,4-benzomorpholine,
2-methyl-3-p-hydroxyphenyl-1,4-benzomorpholine,
2-ethyl-3-phenyl-1,4-benzomorpholine,
2-ethyl-3-phenyl-7-methoxy-1,4-benzomorpholine, and
2-ethyl-3-p-hydroxyphenyl-1,4-benzomorpholine.

Example 2

(a) A solution of 3.91 g. of potassium dissolved in 100 ml. of absolute ethanol is evaporated and the residue is dissolved in 100 ml. tetrahydrofuran. The solution is mixed with 10.9 g. of o-aminophenol, and with stirring, a solution of 30.8 g. of 1-anisyl-1,2-dibromopropane is added thereto dropwise. After boiling for 4 hours, the reaction mixture is evaporated. The 1-anisyl-1-bromo-2-(o-aminophenoxy)-propane which is probably produced as an intermediate is not isolated. The residue is distributed between chloroform and water and the chloroform phase is washed with water, dried over sodium sulfate and evaporated. The residue is chromatographed in chloroform on silica gel, thus obtaining 2-methyl-3-anisyl-1,4-benzomorpholine, M.P. 64° (from ether/petroleum ether).

Analogously, the following compounds are obtained:

from 1-phenyl-1,2-dibromobutane:
  2-ethyl-3-phenyl-1,4-benzomorpholine;
from 1-p-benzyloxyphenyl-1,2-dibromopropane:
  2-methyl-3-p-benzyloxyphenyl-1,4-benzomorpholine;
from 1-p-benzyloxyphenyl-1,2-dibromobutane:
  2-ethyl-3-p-benzyloxyphenyl-1,4-benzomorpholine.

(b) One gram of 2-methyl-3-anisyl-1,4-benzomorpholine is boiled for 30 minutes in 10 ml. of nitrobenzene. The nitrobenzene is removed with steam, the reaction mixture extracted with chloroform, the chloroform phase washed with water, evaporated, and 2-methyl-3-anisyl-2H-1,4-benzoxazine is obtained, M.P. 124–125° (from ether).

Analogously, 2-ethyl-3-phenyl-2H-1,4-benzoxazine is produced from 2-ethyl-3-phenyl-1,4-benzomorpholine with nitrobenzene.

(c) 0.5 g. of 2-methyl-3-p-benzyloxyphenyl-1,4-benzomorpholine is shaken in 100 ml. of methanol in the presence of 0.2 g. of 5% palladium charcoal with hydrogen, at room temperature and normal pressure. After filtering and evaporation, 2-methyl-3-p-hydroxyphenyl-1,4-benzomorpholine is obtained.

Analogously, 2-ethyl-3-p-hydroxyphenyl-1,4-benzomorpholine is obtained from 2-ethyl-3-p-benzyloxyphenyl-1,4-benzomorpholine by hydrogenolysis.

Example 3

(a) 15 g. of α-(o-nitrophenylmercapto)-p-methoxypropionphenone (M.P. 94–95°, from methanol) which is obtainable by the reaction of o-nitrobenzenesulfenyl chloride and p-methoxypropiophenone in ethylene chloride, is boiled with 150 ml. of a SnCl₂ solution produced by introducing dry hydrogen chloride for 6 hours into a suspension of 200 g. of SnCl₂·2H₂O in 380 ml. of acetic acid. The reaction mixture is cooled, made alkaline with dilute solution of sodium hydroxide, and extracted with chloroform. The chloroform extract is washed with water, evaporated, and the residue chromatographed on silica gel with chloroform, thus obtaining 2-methyl-3-anisyl-2H-1,4-benzothiazine, M.P. 72–74° (from methanol).

Analogously, the following compounds are obtained:

from α-(o-nitrophenylmercapto)-propiophenone: 2-methyl-3-phenyl-2H-1,4-benzothiazine;
from α-(o-nitrophenylmercapto)-p-methyl-propiophenone: 2-methyl-3-p-tolyl-2H-1,4-benzothiazine;
from α-(o-nitrophenylmercapto)-p-ethyl-propiophenone: 2-methyl-3-p-ethylphenyl-2H-1,4-benzothiazine;
from α-(o-nitrophenylmercapto)-p-isopropyl-propiophenone: 2-methyl-3-p-isopropylphenyl-2H-1,4-benzothiazine;
from α-(o-nitrophenylmercapto)-p-isobutyl-propiophenone: 2-methyl-3-p-isobutylphenyl-2H-1,4-benzothiazine;
from α-(2-nitro-4-methylphenylmercapto)-p-methoxypropiophenone (M.P. 74–75°): 2,6-dimethyl-3-anisyl-2H-1,4-benzothiazine, M.P. 117–118° (methanol);
from α-(2-nitro-5-methoxyphenylmercapto)-p-methoxypropiophenone: 2-methyl-3-anisyl-7-methoxy-2H-1,4-benzothiazine;
from α-(o-nitrophenylmercapto)-p-benzyloxy-butyrophenone: 2-ethyl-3-p-benzyloxyphenyl-2H-1,4-benzothiazine;
from α-(o-nitrophenylmercapto)-butyrophenone: 2-ethyl-3-phenyl-2H-1,4-benzothiazine;
from α-(o-nitrophenylmercapto)-p-methyl-butyrophenone: 2-ethyl-3-p-tolyl-2H-1,4-benzothiazine;
from α-(o-nitrophenylmercapto)-p-ethyl-butyrophenone: 2-ethyl-3-p-ethylphenyl-2H-1,4-benzothiazine;
from α-(o-nitrophenylmercapto)p-isopropyl-butyrophenone: 2-ethyl-3-p-isopropylphenyl-2H-1,4-benzothiazine;
from α-(o-nitrophenylmercapto)-p-isobutyl-butyrophenone: 2-ethyl-3-p-isobutylphenyl-2H-1,4-benzothiazine;
from α-(2-nitro-4-methylphenylmercapto)-p-benzyloxybutyrophenone: 2-ethyl-3-p-benzyloxyphenyl-6-methyl-2H-1,4-benzothiazine;
from α-(2-nitro-5-methoxyphenylmercapto)-p-benzyloxybutyrophenone: 2-ethyl-3-p-benzyloxyphenyl-7-methoxy-2H-1,4-benzothiazine.

(b) A solution of 5 g. of 2-methyl-3-anisyl-2H-1,4-benzothiazine in 820 ml. of absolute ether is mixed with a suspension of 2.9 g. of LiAlH₄ in 80 ml. of ether and stirred for 6 hours at 20°. After adding 65 ml. of a 10% potassium hydroxide solution, the reaction mixture is filtered and the ether phase is separated, washed with water, dried over sodium sulfate, evaporated, and the residue is chromatographed with chloroform on silica gel, to give 2-methyl-3-anisyl-1,4-benzothiomorpholine, M.P. 78–80° (from methanol).

Analogously, the following compounds are produced from the corresponding benzothiazines:

2,6-dimethyl-3-anisyl-1,4-benzothiomorpholine (hydrochloride, M.P. 222–223°)
2-methyl-3-anisyl-7-methoxy-1,4-benzothiomorpholine
2-ethyl-3-p-benzyloxyphenyl-1,4-benzothiomorpholine
2-ethyl-3-p-benzyloxyphenyl-6-methyl-1,4-benzothiomorpholine
2-ethyl-3-p-benzyloxyphenyl-7-methoxy-1,4-benzothiomorpholine.

(c) 5 g. of 2,6-dimethyl-3-anisyl-1,4-benzothiomorpholine is heated with 15 ml. of acetic anhydride for 4 hours to 100°. The mixture is then cooled, poured into water, heated for 10 minutes to 70°, cooled, and extracted with chloroform. The chloroform extracts are washed with solution of sodium bicarbonate and water, dried over sodium sulfate and evaporated. The thus-obtained oil is purified by plate chromatography to give 2,6-dimethyl-3-anisyl-4-acetyl-1,4-benzothiomorpholine, M.P. 104–105°.

Analogously, from 2-ethyl-3-p-benzyloxyphenyl-6-methyl-1,4-benzothiomorpholine, there is obtained 2-ethyl-3-p-benzyloxyphenyl-4-acetyl-6-methyl-1,4-benzothiomorpholine.

By reaction with benzoyl chloride in dioxane, from 2,6-dimethyl-3-anisyl-4-benzoyl-1,4-benzothiomorpholine, M.P. 118°, there is obtained 2-ethyl-3-p-benzyloxyphenyl-4-benzoyl-6-methyl-1,4-benzothiomorpholine.

Analogously, the following are obtainable from the corresponding 1,4-benzomorpholines or 1,4- benzothiomorpholines with the appropriate acid halide or anhydride:

2-methyl-3-anisyl-4-acetyl-1,4-benzomorpholine,
2-methyl-3-anisyl-4-propionyl-1,4-benzomorpholine,
2-methyl-3-anisyl-4-butyryl-1,4-benzomorpholine,
2-methyl-3-anisyl-4-benzoyl-1,4-benzomorpholine,
2-methyl-3-anisyl-4-acetyl-1,4-benzothiomorpholine,
2-methyl-3-anisyl-4-propionyl1,4-benzothiomorpholine,
2-methyl-3-anisyl-4-butyryl-1,4-benzothiomorpholine,
2-methyl-3-anisyl-4-caproyl-1,4-benzothiomorpholine,
2-methyl-3-anisyl-4-octanoyl-1,4-benzothiomorpholine,
2-methyl-3-anisyl-4-benzoyl-1,4-benzothiomorpholine,
2-ethyl-3-p-benzyloxyphenyl-4-acetyl-1,4-benzomorpholine,
2-ethyl-3-p-benzyloxyphenyl-4-propionyl-1,4-benzomorpholine,
2-ethyl-3-p-benzyloxyphenyl-4-butyryl-1,4-benzomorpholine,
2-ethyl-3-p-benzyloxyphenyl-4-benzoyl-1,4-benzomorpholine,
2-ethyl-3-p-benzyloxyphenyl-4-acetyl-1,4-benzothiomorpholine,
2-ethyl-3-p-benzyloxyphenyl-4-propionyl-1,4-benzothiomorpholine,
2-ethyl-3-p-benzyloxyphenyl-4-butyryl-1,4-benzothiomorpholine,
2-ethyl-3-p-benzyloxyphenyl-4-caproyl-1,4-benzothiomorpholine,
2-ethyl-3-p-benzyloxyphenyl-4-octanoyl-1,4-benzothiomorpholine,
2-ethyl-3-p-benzyloxyphenyl-4-benzoyl-1,4-benzothiomorpholine, Example 4

(a) 15 g. of α-(o - nitrophenylmercapto)-p-hydroxypropiophenone (M.P. 159–160°) which is obtainable by reacting o-nitrobenzene-sulfenyl chloride with p-acetoxypropiophenone, the acetoxy group being simultaneously saponified, is boiled for 6 hours with 150 ml. of an $SnCl_2$ solution produced in accordance with Example 3. The reaction mixture is cooled, the tin salts are filtered off, and the filtrate is stirred into approximately 1.5 l. of ice water. 2-methyl-3-p-hydroxyphenyl-2H-1,4-benzothiazine hydrochloride separates, M.P. 277° (from acetic acid).

Analogously, the following compounds are obtained:

from α-(2-nitro-5-methoxyphenylmercapto)-p-hydroxypropiophenone: 2-methyl-3-p-hydroxyphenyl-7-methoxy-2H-1,4-benzothiazine hydrochloride;
from α-(o-nitrophenylmercapto)-p-hydroxy-butyrophenone (M.P. 136–138°): 2-ethyl-3-p-hydroxyphenyl-2H-1,4-benzothiazine hydrochloride, M.P. 264–266°;
from α-(o-nitrophenylmercapto)-p-hydroxy-valerophenone (M.P. 120–122°): 2-n-propyl-3-p-hydroxyphenyl-2H-1,4-benzothiazine hydrochloride; M.P. 225–227°;
from α-(o-nitrophenylmercapto)-n-pentyl-(p-hydroxyphenyl)-ketone: 2-n-butyl-3-p-hydroxyphenyl-2H-1,4-benzothiazine hydrochloride;
from [1-(o-nitrophenylmercapto)-3-methylbutyl]-(p-hydroxyphenyl)-ketone: 2-isobutyl-3-p-hydroxyphenyl-2H-1,4-benzothiazine hydrochloride;
from α-(o-nitrophenylmercapto)-n-hexyl-(p-hydroxyphenyl)-ketone: 2-n-pentyl-3-p-hydroxyphenyl-2H-1,4-benzothiazine hydrochloride;
from α-(o-nitrophenylmercapto)-n-heptyl-(p-hydroxyphenyl)-ketone: 2-n-hexyl-3-p-hydroxyphenyl-2H-1,4-benzothiazine hydrochloride;
from α-(2-nitro-5-methoxyphenylmercapto)-p-hydroxybutyrophenone: 2-ethyl-3-p-hydroxyphenyl-7-methoxy-2H-1,4-benzothiazine hydrochloride.

(b) 10 g. of 2 - methyl - 3 - (p-hydroxyphenyl)-2H-1,4-benzothiazine hydrochloride is dissolved in 50 ml. of pyridine, 2 g. of $NaBH_4$ is added and the reaction mixture is stirred for about 3 hours at 50° Another 1.2 g. of $NaBH_4$ is then added and stirring is continued overnight at room temperature. Thereafter, the solution is poured into water, extracted with chloroform, the chloroform extract is washed with water, dried over sodium sulfate, evaporated, chromatographed with benzene on silica gel. There is obtained 2-methyl-3-p-hydroxyphenyl-1,4-benzothiomorpholine, M.P. 174–175° (from benzene/petroleum ether).

Analogously, the following compounds are obtained from the corresponding benzothiazines:

2-ethyl-3-p-hydroxyphenyl-1,4-benzothiomorpholine, M.P. 152–154°;
2-n-propyl-3-p-hydroxyphenyl-1,4-benzothiomorpholine, M.P. 116–117°;
2-n-butyl-3-p-hydroxyphenyl-1,4,-benzothiomorpholine;
2-isobutyl-3-p-hydroxyphenyl-1,4-benzothiomorpholine;
2-n-pentyl-3-p-hydroxyphenyl-1,4-benzothiomorpholine;
2-n-hexyl-3-p-hydroxyphenyl-1,4-benzothiomorpholine;
2-methyl-3-p-hydroxyphenyl-7-methoxy-1,4-benzothiomorpholine; and
2-ethyl-3-p-hydroxyphenyl-7-methoxy-1,4-benzothiomorpholine.

(c) A solution of 255 mg. of 2-methyl-3-p-hydroxyphenyl-2H-1,4-benzothiazine in 2 ml. of 1 N solution of sodium hydroxide is mixed with a solution of 180 mg. of dimethyl sulfate in a small amount of ether. The reaction mixture is stirred overnight, chloroform is added thereto, a separating step is conducted as described above and the extract is evaporated. 2-methyl-3-anisyl-2H-1,4-benzothiazine is thus obtained, M.P. 72–74°.

(d) A solution of 255 mg. of 2-methyl-3-p-hydroxyphenyl-2H-1,4-benzothiazine in 5 ml. of dry acetone is boiled for 24 hours with 0.5 ml. of methyl iodide and 0.1 g. of anhydrous potassium carbonate. The reaction mixture is filtered, evaporated, the residue is chromatographed in chloroform on silica gel. 2 - methyl - 3-anisyl-2H-1,4-benzothiazine is obtained, M.P. 72–74°.

Analogously, the following compounds can be obtained by the reaction of the corresponding free phenols with the corresponding alkyl chlorides, bromides or iodides:

2-methyl-3-p-ethoxyphenyl-2H-1,4-benzothiazine;
2-methyl-3-p-propoxyphenyl-2H-1,4-benzothiazine;
2-methyl-3-p-isopropoxyphenyl-2H-1,4-benzothiazine;
2-methyl-3-p-n-butoxyphenyl-2H-1,4-benzothiazine;
2-methyl-3-p-isobutoxyphenyl-2H-1,4-benzothiazine; and
2-methyl-3-p-benzyloxyphenyl-2H-1,4-benzothiazine.

(e) 4 g. of 2-methyl-3-p-hydroxyphenyl-1,4-benzothiomorpholine is stirred with 40 ml. of pyridine and 2 g. of nicotinic acid chloride for 17 hours at room temperature. The reaction mixture is then poured into water, vacuum-filtered and washed with water. 2-methyl-3-p-nicotinoyloxyphenyl - 1,4 - benzothiomorpholine is obtained, M.P. 178–179° (from acetone).

Analogously, the following compounds are obtained by reacting the corresponding free phenols with the corresponding acid chlorides or anhydrides:

2-methyl-3-p-acetoxyphenyl-2H-1,4-benzoxazine;
2-methyl-3-p-acetoxyphenyl-1,4-benzomorpholine;
2-methyl-3-p-acetoxyphenyl-2H-1,4-benzothiazine;
2-methyl-3-p-acetoxyphenyl-1,4-benzothiomorpholine;
2-methyl-3-p-acetoxyphenyl-7-methoxy-2H-1,4-benzothiazine;
2-methyl-3-p-acetoxyphenyl-7-methoxy-1,4-benzothiomorpholine;
2-methyl-3-p-nicotinoyloxyphenyl-2H-1,4-benzoxazine;
2-methyl-3-p-nicotinoyloxyphenyl-1,4-benzomorpholine;

2-methyl-3-p-nicotinoyloxyphenyl-2H-1,4-benzothiazine;
2-methyl-3-p-nicotinoyloxyphenyl-7-methoxy-2H-1,4-benzothiazine;
2-methyl-3-p-nicotinoyloxyphenyl-7-methoxy-1,4-benzothiomorpholine;
2-methyl-3-p-isonicotinoyloxyphenyl-2H-1,4-benzoxazine;
2-methyl-3-p-isonicotinoyloxyphenyl-1,4-benzomorpholine;
2-methyl-3-p-isonicotinoyloxyphenyl-2H-1,4-benzothiazine;
2-methyl-3-p-isonicotinoyloxyphenyl-1,4-benzothiomorpholine;
2-methyl-3-p-isonicotinoyloxyphenyl-7-methoxy-2H-1,4-benzothiazine;
2-methyl-3-p-isonicotinoyloxyphenyl-7-methoxy-1,4-benzothiomorpholine;
2-ethyl-3-p-acetoxyphenyl-2H-1,4-benzoxazine;
2-ethyl-3-p-acetoxyphenyl-1,4-benzomorpholine;
2-ethyl-3-p-acetoxyphenyl-2H-1,4-benzothiazine;
2-n-propyl-3-p-acetoxyphenyl-2H-1,4-benzothiazine;
2-ethyl-3-p-acetoxyphenyl-1,4-benzothiomorpholine;
2-n-propyl-3-p-acetoxyphenyl-1,4-benzothiomorpholine;
2-ethyl-3-p-acetoxyphenyl-7-methoxy-2H-1,4-benzothiazine;
2-ethyl-3-p-acetoxyphenyl-7-methoxy-1,4-benzothiomorpholine;
2-ethyl-3-p-nicotinoyloxyphenyl-2H-1,4-benzoxazine;
2-ethyl-3-p-nicotinoyloxyphenyl-1,4-benzomorpholine;
2-ethyl-3-p-nicotinoyloxyphenyl-2H-1,4-benzothiazine;
2-n-propyl-3-p-nicotinoyloxyphenyl-2H-1,4-benzothiazine;
2-ethyl-3-p-nicotinoyloxyphenyl-7-methoxy-2H-1,4-benzothiazine;
2-ethyl-3-p-nicotinoyloxyphenyl-1,4-benzothiomorpholine;
2-n-propyl-3-p-nicotinoyloxyphenyl-1,4-benzothiomorpholine, M.P. 162–163°;
2-ethyl-3-p-nicotinoyloxyphenyl-7-methoxy-1,4-benzothiomorpholine;
2-ethyl-3-p-isonicotinoyloxyphenyl-2H-1,4-benzoxazine;
2-ethyl-3-p-isonicotinoyloxyphenyl-1,4-benzomorpholine;
2-ethyl-3-p-isonicotinoyloxyphenyl-2H-1,4-benzothiazine;
2-n-propyl-3-p-isonicotinoyloxyphenyl-2H-1,4-benzothiazine;
2-ethyl-3-p-isonicotinoyloxyphenyl-1,4-benzothiomorpholine;
2-n-propyl-3-p-isonicotinoyloxyphenyl-1,4-benzothiomorpholine;
2-ethyl-3-p-isonicotinoyloxyphenyl-7-methoxy-2H-1,4-benzothiazine; and
2-ethyl-3-p-isonicotinoyloxyphenyl-7-methoxy-1,4-benzothiomorpholine.

(f) 3 g. of 2-methyl - 3 - (p-hydroxyphenyl)-1,4-benzothiomorpholine is heated with stirring on a steam bath for 50 minutes with 30 ml. of pyridine and 3 g. of amidosulfonic acid. The reaction mixture is filtered, the filtrate is shaken thoroughly with 2 N sodium hydroxide and the pyridine phase is separated and washed several times with ether. The thus-obtained sulfate of the sodium salt of 2-methyl - 3 - (p-hydroxyphenyl) - 1,4 - benzothiomorpholine sulfuric acid ester is purified by chromatographing on silica gel (eluting agent: chloroform/methanol 9:1), and thereafter melts at 218–222°.

Analogously, the sodium salts of the following compounds are obtained from the corresponding free phenols:

2-methyl-3-(p-sulfatophenyl)-2H-1,4-benzoxazine;
2-methyl-3-(p-sulfatophenyl)-1,4-benzomorpholine;
2-methyl-3-(p-sulfatophenyl)-2H-1,4-benzothiazine;
2-methyl-3-(p-sulfatophenyl)-7-methoxy-2H-1,4-benzothiazine;
2-methyl-3-(p-sulfatophenyl)-7-methoxy-1,4-benzothiomorpholine;
2-ethyl-3-p-sulfatophenyl-2H-1,4-benzoxazine;
2-ethyl-3-p-sulfatophenyl-1,4-benzomorpholine;
2-ethyl-3-p-sulfatophenyl-2H-1,4-benzothiazine;
2-n-propyl-3-p-sulfatophenyl-2H-1,4-benzothiazine;
2-ethyl-3-p-sulfatophenyl-7-methoxy-2H-1,4-benzothiazine;
2-ethyl-3-p-sulfatophenyl-1,4-benzothiomorpholine;
2-n-propyl-3-p-sulfatophenyl-1,4-benzothiomorpholine; and
2-ethyl-3-p-sulfatophenyl-7-methoxy-1,4-benzothiomorpholine.

(g) A solution of 2 g. of 2-methyl-3-p-hydroxyphenyl-2H-1,4-benzoxazine in 20 ml. of absolute pyridine is mixed at −25° with 10 ml. of a solution of phosphoric acid chloride dibenzyl ester in absolute ether. The reaction mixture is stirred for one hour at −25° and allowed to stand overnight at −5°. The reaction mixture is then stirred into ice water, acidified to a pH of 4 with hydrochloric acid, extracted with ether, and dried over sodium sulfate. The residue obtained from the ether solution is dissolved in 100 ml. of methanol. After adding 180 mg. of 10% palladium charcoal, the hydrogenation step is conducted until the absorption of hydrogen is terminated. The catalyst is filtered off, the reaction mixture is evaporated, and 2-methyl-3-p-phosphatophenyl - 2H-1,4 - benzoxazine is obtained.

Analogously, the following compounds are obtained from the corresponding free phenols:

2-methyl-3-p-phosphatophenyl-1,4-benzomorpholine;
2-methyl-3-p-phosphatophenyl-2H-1,4-benzothiazine;
2-methyl-3-p-phosphatophenyl-1,4-benzothiomorpholine;
2-methyl-3-p-phosphatophenyl-7-methoxy-2H-1,4-benzothiazine;
2-methyl-3-p-phosphatophenyl-7-methoxy-1,4-benzothiomorpholine;
2-ethyl-3-p-phosphatophenyl-2H-1,4-benzoxazine;
2-ethyl-3-p-phosphatophenyl-1,4-benzomorpholine;
2-ethyl-3-p-phosphatophenyl-2H-1,4-benzothiazine;
2-n-propyl-3-p-phosphatophenyl-2H-1,4-benzothiazine;
2-ethyl-3-p-phosphatophenyl-1,4-benzothiomorpholine;
2-n-propyl-3-p-phosphatophenyl-1,4-benzothiomorpholine;
2-ethyl-3-p-phosphatophenyl-7-methoxy-2H-1,4-benzothiazine; and
2-ethyl-3-p-phosphatophenyl-7-methoxy-1,4-benzothiomorpholine.

Example 5

To a solution of 17.9 g. of 2-methyl-1,4-benzothiomorpholin-3-one in 250 ml. of absolute dioxane is added dropwise with stirring and a Grignard solution prepared from 22.4 g. of p-bromoanisole and 3 g. of magnesium in 250 ml. of ether. The reaction mixture is then heated for about 20 minutes on a steam bath. The mixture containing the 2 - methyl-3-anisyl-3-hydroxy-1,4-benzothiomorpholine is cooled to room temperature and stirred into semi-concentrated hydrochloric acid. The acidic solution is washed several times with chloroform, sodium carbonate solution is added to an alkaline pH, and then extracted several times with chloroform. The extract is washed with water, the chloroform is distilled off, and the residue is chromatographed with chloroform on silica gel, thus obtaining 2-methyl-3-anisyl-2H-1,4-benzothiazine, M.P. 72–74°.

Analogously, 2 - ethyl-3-p-benzyloxyphenyl-2H-1,4-benzothiazine is obtained from 2-ethyl-1,4-benzothiomorpholin-3-one with p-benzyloxyphenylmagnesium bromide by way of 2-ethyl-3-p-benzyloxyphenyl-3-hydroxy-1,4-benzothiomorpholine.

Example 6

One gram of 1-amino-1-anisyl-2-(o-aminophenoxy)-propane, obtainable by reacting 1-anisyl-2-methyl-ethylene oxide with methanolic $NH_3$ to 1-amino-1-anisyl-2-propanol and condensation with o-aminophenol in the presence of $H_2SO_4$ is heated with 20 mg. of iodine for 4 hours to 200°. After cooling, the reaction mixture is taken up in chloroform, the solution is filtered over basic aluminum oxide, the eluate is mixed with petroleum ether, and 2-methyl-3-anisyl-1,4-benzomorpholine is obtained, M.P. 64°.

Analogously, 2 - ethyl-3-p-benzyloxyphenyl-1,4-benzomorpholine is obtained from 1-amino-1-p-benzyloxyphenyl-2-(o-aminophenoxy)-butane, which can be produced from 1-p-benzyloxyphenyl-2-ethyl-ethylene oxide.

Example 7

One gram of 1 - anisyl-1-(o-hydroxyphenylimino)-2-propanol, obtainable by condensing o-aminophenol with 1-anisyl-2-propanol-1-one, is dissolved in 20 ml. of methylene chloride and then mixed with 1.6 g. of solid dicyclohexylcarbodiimide. The reaction solution, after briefly shaking, is allowed to stand for 24 hours at room temperature. The thus-formed dicyclohexyl urea is filtered off, the methylene chloride phase is shaken with 1 N NaOH until no further dicyclohexyl urea is separated, the methylene chloride phase is separated, washed until neutral with water, and worked up as described in Example 1, thus obtaining 2 - methyl-3-anisyl-2H-1,4-benzoxazine, M.P. 124–125°.

Analogously, 2 - ethyl-3-phenyl-2H-1,4-benzoxazine is obtained from 1-phenyl-1-(o-hydroxyphenylimino)-2-butanol, obtainable from 1-phenyl-2-propanol-1-one.

Example 8

One gram of o-(1-anisyl-propylidenamino)-phenyl sulfur chloride, obtainable by condensation of o,o'-diaminodiphenyl disulfide with p-methoxypropiophenone and subsequent cleavage of the disulfide bridge with chlorine in $CCl_4$, is boiled for 6 hours in 20 ml. of trichloroethylene. After cooling, the reaction mixture is washed with water, dried over sodium sulfate, and evaporated, yielding 2-methyl-3-anisyl-2H-1,4-benzothiazine, M.P. 72–74°.

Analogously, 2-ethyl-3-phenyl-2H-1,4-benzothiazine is produced from o-(1-phenyl-butylidenamino)-phenyl sulfur chloride (obtainable from butyrophenone).

Example 9

A solution of 1 g. of 1-phenylimino-1-anisyl-2-propyl sulfur chloride, obtainable by condensing aniline with bis-(1-anisyl-1-oxo-2-propyl)-disulfide and subsequent splitting of the disulfide bridge with chlorine in $CCl_4$ in 20 ml. of nitrobenzene is mixed, with ice-bath cooling and stirring, with 1 g. of aluminum chloride and then agitated for 2 hours. The reaction mixture is poured onto a mixture of ice and hydrochloric acid, mixed with chloroform, and the chloroform layer is separated and washed several times with water. The organic solvents are removed by means of steam, thus yielding 2-methyl-3-anisyl-1,4-2H-benzothiazine, M.P. 72–74°.

Analogously, 2-ethyl-3-phenyl-1,4-2H-benzothiazine is obtained from 1-phenylimino-1-phenyl-2-butyl sulfur chloride, which can be produced from bis-(1-phenyl-1-oxo-2-butyl)-disulfide.

Example 10

(a) 0.5 g. of α-(o-nitrophenoxy)-p-acetoxy-propiophenone, obtainable from α-bromo-p-acetoxy-propiophenone and the K-salt of o-nitrophenol, is suspended in 50 ml. of methanol and hydrogenated, with shaking, using 0.1 g. of Raney nickel catalyst, until the absorption of hydrogen is terminated. The reaction product is filtered, evaporated, and 2-methyl-3-p-acetoxyphenyl-1,4-benzomorpholine is obtained.

Analogously, 2-ethyl-3-p-acetoxyphenyl-1,4-benzomorpholine is produced from α-(o-nitrophenoxy)-p-acetoxybutyrophenone.

(b) 0.2 g. of 2-methyl-3-p-acetoxyphenyl-1,4-benzomorpholine is allowed to stand overnight with 3 ml. of 10% methanolic potassium hydroxide solution. The reaction mixture is acidified with dilute hydrochloric acid and cooled, thus yielding 2-methyl-3-p-hydroxyphenyl-1,4-benzomorpholine.

Analogously, 2-ethyl-3-p-hydroxyphenyl-1,4-benzomorpholine is produced from 2-ethyl-3-p-acetoxyphenyl-1,4-benzomorpholine.

Example 11

A mixture of 1 g. of 1-anisyl-1-o-hydroxyanilino-2-propanol, obtainable from o-aminophenol and 1-anisyl-1-bromo-2-propanol, and 1 g. of p-toluenesulfonic acid is heated for four hours to 120–140°. After cooling, the reaction mixture is mixed with water, made alkaline with sodium hydroxide solution, extracted with chloroform and worked up as described in Example 2(a). There is obtained 2-methyl-3-anisyl-1,4 - benzomorpholine, M.P. 64°.

In an analogous manner, 2-ethyl-3-phenyl-1,4-benzomorpholine is produced from 1-phenyl-1-o-hydroxyanilino-2-butanol, obtainable from 1-phenyl-1-bromo-2-butanol.

Example 12

To a solution of one gram of 1-anisyl-1-o-hydroxyanilino-2-propanol in 50 ml. of absolute benzene is added 3 g. of calcium chloride and the reaction mixture is saturated with dry hydrogen chloride. The mixture is boiled for 6 hours, and worked up as described in Example 11, thus obtaining 2-methyl-3-anisyl-1,4 - benzomorpholine, M.P. 64°.

Analogously, 2-ethyl-3-phenyl - 1,4 - benzomorpholine and 2-n-propyl-3-phenyl-1,4 - benzomorpholine are obtained from 1-phenyl-1-o-hydroxyanilino-2-butanol and 1-phenyl-1-o-hydroxyanilino-2-pentanol, respectively.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The following examples include pharmaceutical compositions of the novel compounds:

Example A.—Tablets

Each tablet contains

| | Mg. |
|---|---|
| 2-ethyl-3-p-hydroxyphenyl - 1,4 - benzothiomorpholine | 5 |
| Lactose | 120 |
| Corn starch | 73 |
| Magnesium stearate | 2 |

Example B.—Coated tablets

Each tablet contains

| | Mg. |
|---|---|
| 2-ethyl-3-p-hydroxyphenyl - 1,4 - benzothiomorpholine | 5 |
| Lactose | 80 |
| Potato starch | 15 |
| Talc | 2 |

The coating (150 mg.) is a conventional mixture of corn starch, sugar, talc, and tragacanth.

Example C.—Solution for injection

A solution of 2 kg. of 2-methyl-3-p-hydroxyphenyl-2H-1,4-benzothiazine hydrochloride in 998 kg. of distilled water is prepared and filled into ampoules in such a manner that each ampoule contains 2 mg. of said salt.

Example D.—Syrup

A mixture of

| | Kg. |
|---|---|
| 2-methyl-3-p-hydroxyphenyl -2 H - 1,4-benzothiazine hydrochloride | 0.2 |
| Glycerol (twice distilled) | 7.5 |
| Cane sugar | 56.0 |
| Methyl p-hydroxybenzoate | 0.07 |
| n-Propyl p-hydroxybenzoate | 0.03 |
| Ethanol | 10.0 |
| Fruit flavorings | (¹) |

¹ As desired.

is prepared and mixed with distilled water in such a manner that the volume of the entire preparation is 100 l. A dosage unit (5 ml.) contains 10 mg. of active substance.

Instead of the cited substances, other compounds covered by Formula I as well as their physiologically compatible acid addition salts can be incorporated into similar compositions.

What is claimed is:

1. A member of the group consisting of a 3-aryl-benzazine of the formula

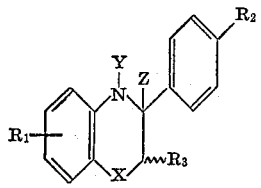

wherein $R_1$ and $R_2$ each are members of the group consisting of H, OH and esters thereof of an alkyl, alkenyl, cycloalkyl, cycloalkylalkyl, carbocyclic aryl, carbocyclic aralkyl or carboxylic acid or a 5–6 membered mono-hetero-heterocyclic carboxylic acid having a nitrogen or oxygen ring member as the hetero atom or alkyl or carbocyclic aryl sulfonic acid of up to 18 carbon atoms or of sulfuric or phosphoric acid, alkyl of 1 to 4 carbon atoms, alkoxy of 1 to 4 carbon atoms, and benzyloxy, $R_1$ representing 1–2 substituents; $R_3$ is alkyl of 1 to 6 carbon atoms; X is S; Y is a member of the group consisting of H, alkanoyl of 1 to 8 carbon atoms, or, collectively with Z, a C—N bond, and Z is H or collectively with Y a C—N bond, with the provision that when $R_1$ is H, $R_2$ is $CH_3O$, X is S, and Y and Z collectively are a C—N bond, $R_3$ is other than $C_2H_5$; and the physiologically acceptable acid addition salts thereof.

2. A compound of claim 1 wherein $R_1$ is H.

3. A compound of claim 1 wherein $R_2$ is selected from the group consisting of H, OH and $OCH_3$.

4. A compound of claim 3 wherein $R_2$ is $OCH_3$.

5. A compound of claim 1 wherein $R_3$ is selected from the group consisting of $CH_3$, $C_2H_5$ and n-$C_3H_7$.

6. A compound of claim 5 wherein $R_3$ is $CH_3$.

7. A compound of claim 5 wherein $R_1$ is H and $R_2$ is selected from the group consisting of H, OH and $OCH_3$.

8. A compound of claim 7, 2-methyl-3-anisyl-2H-1,4-benzothiazine.

9. A compound of claim 7, 2-methyl-3-p-hydroxyphenyl-2H-1,4-benzothiazine and the hydrochloride thereof.

10. A compound of claim 5, 2-ethyl-3-p-hydroxyphenyl-2H-1,4-benzothiazine and the hydrochloride thereof.

11. A compound of claim 5, 2-n-propyl-3-p-hydroxyphenyl-2H-1,4-benzothiazine and the hydrochloride thereof.

12. A compound of claim 6, 2,6-dimethyl-3-anisyl-2H-1,4-benzothiazine.

13. A compound of claim 7, 2-methyl-3-anisyl-1,4-benzothiomorpholine.

14. A compound of claim 7, 2-methyl-3-p-hydroxyphenyl-1,4-benzothiomorpholine.

15. A compound of claim 7, 2-ethyl-3-p-hydroxyphenyl-1,4-benzothiomorpholine.

16. A compound of claim 7, 2-n-propyl-3-p-hydroxyphenyl-1,4-benzothiomorpholine.

17. A compound of claim 2, 2-methyl-3-p-sulfatophenyl - 1,4 - benzothiomorpholine and the sodium salt thereof.

18. A compound of claim 2, 2-methyl-3-p-nicotinoyloxy-1,4-benzothiomorpholine.

19. A compound of claim 2, 2-ethyl-3-p-nicotinoyloxyphenyl-1,4-benzothiomorpholine.

20. A compound of claim 2, 2-n-propyl-3-p-nicotinoyloxyphenyl-1,4-benzothiomorpholine.

21. A compound of claim 6, 2,6-dimethyl-3-anisyl-1,4-benzothiomorpholine.

22. A compound of claim 6, 2,6-dimethyl-3-anisyl-4-acetyl-1,4-benzothiomorpholine.

23. A compound of claim 6, 2,6-dimethyl-3-anisyl-4-benzoyl-1,4-benzothiomorpholine.

References Cited

UNITED STATES PATENTS

| 2,364,347 | 12/1944 | Dickey et al. | 260—243 X |
| 2,374,181 | 4/1945 | Dickey et al. | 260—243 X |
| 2,381,935 | 8/1945 | Strain et al. | 260—243 X |
| 2,824,101 | 2/1958 | Zimmermann | 260—243 |

JOHN M. FORD, Primary Examiner

U.S. Cl. X.R.

260—244 R; 424—246, 248